United States Patent
Park et al.

(10) Patent No.: US 9,768,930 B2
(45) Date of Patent: Sep. 19, 2017

(54) METHOD FOR REPORTING CHANNEL STATE INFORMATION, METHOD FOR SUPPORTING SAME, AND APPARATUS FOR SAID METHODS

(71) Applicant: LG ELECTRONICS INC., Seoul (KR)

(72) Inventors: Jonghyun Park, Anyang-si (KR); Illsoo Sohn, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/373,082

(22) PCT Filed: Feb. 8, 2013

(86) PCT No.: PCT/KR2013/001026
§ 371 (c)(1),
(2) Date: Jul. 18, 2014

(87) PCT Pub. No.: WO2013/119073
PCT Pub. Date: Aug. 15, 2013

(65) Prior Publication Data
US 2015/0029966 A1    Jan. 29, 2015

Related U.S. Application Data

(60) Provisional application No. 61/597,725, filed on Feb. 11, 2012, provisional application No. 61/669,655, (Continued)

(51) Int. Cl.
*H04L 5/00* (2006.01)
*H04B 7/06* (2006.01)
*H04B 7/024* (2017.01)

(52) U.S. Cl.
CPC ............ *H04L 5/0053* (2013.01); *H04L 5/005* (2013.01); *H04L 5/0014* (2013.01);
(Continued)

(58) Field of Classification Search
USPC ......................................................... 370/329
See application file for complete search history.

(56) References Cited

U.S. PATENT DOCUMENTS

2011/0116437 A1*  5/2011  Chen .................... H04B 7/0689
                                                             370/312
2011/0319109 A1   12/2011  Kang et al.
(Continued)

FOREIGN PATENT DOCUMENTS

JP       2011-234299 A      11/2011
KR    10-2011-0119778 A    11/2011
(Continued)

OTHER PUBLICATIONS

3GPP, "LS on Geographically Separated Antenna and Impact on CSI Estimation," 3GPP TSG-RAN WG4 Meeting #62, R4-121116, Dresden, Germany, Feb. 6-10, 2012, 2 pages.
(Continued)

*Primary Examiner* — Mohammad Anwar
*Assistant Examiner* — Kokou R Detse
(74) *Attorney, Agent, or Firm* — Birch, Stewart, Kolasch & Birch, LLP

(57) ABSTRACT

According to one embodiment of the present invention, the method for receiving a channel state information (CSI)-reference signal (RS) from a wireless communication system by a user device comprises the steps of: receiving resource configuration information on the CSI-RS; and receiving the CSI-RS on the basis of the resource configuration information on the CIS-RS, wherein the resource configuration information on the CSI-RS includes informa-
(Continued)

tion on a cell specific-RS (CRS) related to the CSI-RS, and the user device can assume that an antenna port related to information on the CRS and an antenna port used for transmitting CSI-RS corresponding to the resource configuration information on the CSI-RS are quasi co-located.

18 Claims, 9 Drawing Sheets

Related U.S. Application Data filed on Jul. 9, 2012, provisional application No. 61/672,253, filed on Jul. 16, 2012, provisional application No. 61/675,810, filed on Jul. 25, 2012, provisional application No. 61/674,471, filed on Jul. 30, 2012, provisional application No. 61/678,617, filed on Aug. 1, 2012.

(52) U.S. Cl.
CPC ............ *H04L 5/0094* (2013.01); *H04B 7/024* (2013.01); *H04B 7/0626* (2013.01)

(56) References Cited

U.S. PATENT DOCUMENTS

| | | |
|---|---|---|
| 2012/0033608 A1 | 2/2012 | Seo et al. |
| 2013/0058279 A1 | 3/2013 | Kakishima et al. |
| 2013/0094384 A1 | 4/2013 | Park et al. |
| 2013/0194931 A1* | 8/2013 | Lee .................... H04L 5/0053 370/241 |

FOREIGN PATENT DOCUMENTS

| | | |
|---|---|---|
| KR | 10-2012-0001599 A | 1/2012 |
| WO | WO 2010/148119 A2 | 12/2010 |
| WO | WO 2011/115421 A2 | 9/2011 |
| WO | WO 2011/119005 A2 | 9/2011 |
| WO | WO 2011/145886 A2 | 11/2011 |

OTHER PUBLICATIONS

3GPP, "RAN1 Chairman's Notes," 3GPP TSG RAN WG1 Meeting #69, R1-122960, Prague, Czech Republic, May 21-25, 2012, 35 pages.
Alcatel-Lucent et al., "Further Discussion of Quasi-co-located Antenna Ports," 3GPP TSG-RAN1 Meeting #69, R1-122458, Prague, Czech Republic, May 21-25, 2012, 3 pages.
Huawei et al., "Configuration of CSI-RS for CoMP," 3GPP TSG RAN WG1 Meeting #67, R1-113642, San Francisco, USA, Nov. 14-18, 2011, 2 pages.
Huawei et al., "CSI-RS Configuration and Signalling," 3GPP TSG RAN WG1 Meeting #66bis, R1-112902, Zhuhai, China, Oct. 10-14, 2011, 3 pages.
Huawei, "CSI-RS Pattern Signalling," 3GPP TSG RAN WG1 Meeting #62, R1-104290, Madrid, Spain, Aug. 23-27, 2010, 6 pages.
LG Electronics, "Discussion on Quasi-co-located Antenna Ports," 3GPP TSG RAN WG1 Meeting #70, R1-123538, Qingdao, China, Aug. 13-17, 2012, 4 pages.
Motorola Mobility, "Downlink RS Configuration for CoMP," 3GPP TSG RAN1 #68, R1-120523, Dresden, Germany, Feb. 6-10, 2012, 3 pages.
Nokia Siemens Networks et al., "Per-cell Rel-8 CRS-based Feedback," 3GPP TSG-RAN WG1 Meeting #68, R1-120720, Dresden, Germany, Feb. 6-10, 2012, 3 pages.
Renesas Mobile Europe Ltd., "UE Assumption on Colocation of Antennas," 3GPP TSG-RAN WG1 Meeting #69, R1-122334, Prague, Czech Republic, May 21-25, 2012, 5 pages.
3 GPP TS 36.213 V10.4.0, "3rd Generation Partnership Project; Technical Specification Group Radio Access Network; Evolved Universal Terrestrial Radio Access (E-UTRA); Physical layer procedures (Release 10)", Dec. 2011, 125 pages.

* cited by examiner

METHOD FOR REPORTING CHANNEL STATE INFORMATION, METHOD FOR SUPPORTING SAME, AND APPARATUS FOR SAID METHODS

This application is the National Phase of PCT International Application No. PCT/KR2013/001026, filed on Feb. 8, 2013, which claims priority under 35 U.S.C. 119(e) to U.S. Provisional Application Nos. 61/597,725; 61/669,655; 61/672,253; 61/675,810; 61/677,471, and 61/678,617 filed on Feb. 11, 2012; Jul. 9, 2012; Jul. 16, 2012; Jul. 25, 2012; Jul. 30, 2012, and Aug. 1, 2012, all of which are hereby expressly incorporated by reference into the present application.

TECHNICAL FIELD

The present invention relates to a wireless communication system. Specifically, the present invention relates to a method for reporting channel state information, a method for supporting the same and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for reporting or feeding back channel state information.

Another object of the present invention is to provide a method for transmitting or receiving information necessary to report or to feed back channel state information.

The technical problems solved by the present invention are not limited to the above technical problems and those skilled in the art may understand other technical problems from the following description.

Technical Solution

The object of the present invention can be achieved by providing a method for receiving, by user equipment (UE), a channel state information (CSI)-reference signal (RS) in a wireless communication system, comprising: receiving CSI-RS resource configuration information; and receiving the CSI-RS based on the CSI-RS resource configuration information, wherein the CSI-RS resource configuration information includes information on a cell specific-RS (CRS) related to the CSI-RS, and the UE assumes that an antenna port associated with the information on the CRS and an antenna port used to transmit the CSI-RS corresponding to the CSI-RS resource configuration information are quasi-co-located.

Additionally or alternatively, the information on the CRS may be used to acquire a large-scale property of a radio channel from the antenna port used to transmit the CSI-RS.

Additionally or alternatively, the large-scale property of the radio channel from the antenna port used to transmit the CSI-RS may be derived from a radio channel from an antenna port used to transmit the CRS.

Additionally or alternatively, the information on the CRS may include identification information about the CRS.

Additionally or alternatively, the UE may be configured in transmission mode 10.

Additionally or alternatively, the UE may assume that an antenna port used to transmit a demodulation reference signal (DMRS) and the antenna port used to transmit the CSI-RS identified by the CSI-RS resource configuration information are quasi-co-located with respect to large-scale properties of radio channels from the antenna ports.

Additionally or alternatively, the CSI-RS resource configuration information may be received through higher layer signaling.

Additionally or alternatively, the CSI-RS and the CRS may be transmitted from different cells.

Additionally or alternatively, the large-scale property of the radio channel may include at least one of delay spread, Doppler spread, Doppler shift, average gain and average delay.

In another aspect of the present invention, provided herein is a method for a method for transmitting, by an enhanced node B (eNB), CSI-RS in a wireless communication system, comprising: transmitting CSI-RS resource configuration information to a UE; and transmitting the CSI-RS based on the CSI-RS resource configuration information to the UE, wherein the CSI-RS resource configuration information includes information on a CRS related to the CSI-RS, and the UE assumes that an antenna port associated with the information on the CRS and an antenna port used to transmit the CSI-RS corresponding to the CSI-RS resource configuration information on the CSI-RS are quasi-co-located.

In another aspect of the present invention, provided herein is a user equipment (UE) configured to receive a CSI-RS in a wireless communication system, comprising: a radio frequency (RF) unit; and a processor configured to control the RF unit, wherein the processor is configured to receive CSI-RS resource configuration information and to receive the CSI-RS based on the CSI-RS resource configuration information, wherein the CSI-RS resource configuration information includes information on a CRS related to the CSI-RS, and the UE assumes that an antenna port associated with the information on the CRS and an antenna port used to transmit the CSI-RS corresponding to the CSI-RS resource configuration information are quasi-co-located.

Additionally or alternatively, the information on the CRS may be used to acquire a large-scale property of a radio channel from the antenna port used to transmit the CSI-RS.

Additionally or alternatively, the large-scale property of the radio channel from the antenna port used to transmit the CSI-RS may be derived from a radio channel from an antenna port used to transmit the CRS.

Additionally or alternatively, the information on the CRS may include identification information about the CRS.

Additionally or alternatively, the UE may be configured in transmission mode 10.

Additionally or alternatively, the UE may assume that an antenna port used to transmit a demodulation reference signal (DMRS) and the antenna port used to transmit the CSI-RS identified by the CSI-RS resource configuration information are quasi-co-located with respect to large-scale properties of radio channels from the antenna ports.

Additionally or alternatively, the resource configuration information on the CSI-RS may be received through higher layer signaling.

Additionally or alternatively, the CSI-RS and the CRS may be transmitted from different cells.

Additionally or alternatively, the large-scale property of the radio channel may include at least one of delay spread, Doppler spread, Doppler shift, average gain and average delay.

In another aspect of the present invention, provided herein is an enhanced node B (eNB) configured to transmit a CSI-RS in a wireless communication system, comprising: an RF unit; and a processor configured to control the RF unit, wherein the processor is configured to transmit CSI-RS resource configuration information to a UE and to transmit the CSI-RS based on the CSI-RS resource configuration information to the UE, wherein the CSI-RS resource configuration information includes information on a CRS related to the CSI-RS, and the UE assumes that an antenna port associated with the information on the CRS and an antenna port used to transmit the CSI-RS corresponding to the CSI-RS resource configuration information are quasi-co-located.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to embodiments of the present invention, processing load or complexity of user equipment can be reduced when channel state information is reported.

In addition, efficiency of utilization of uplink/downlink resources is improved.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
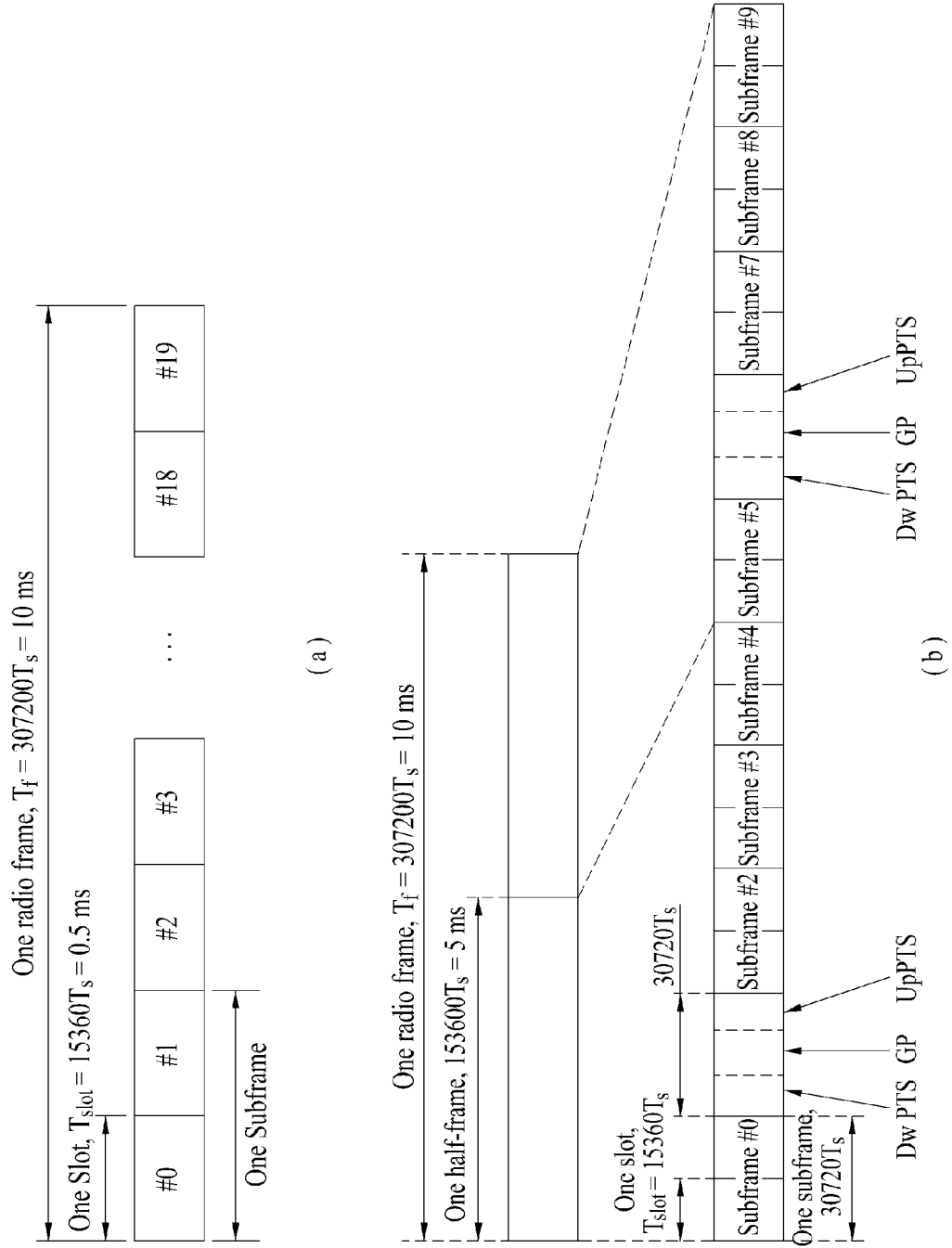
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(*a*) illustrates a frame structure for frequency division duplex (FDD) used in 3GPP LTE/LTE-A and FIG. 1(*b*) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
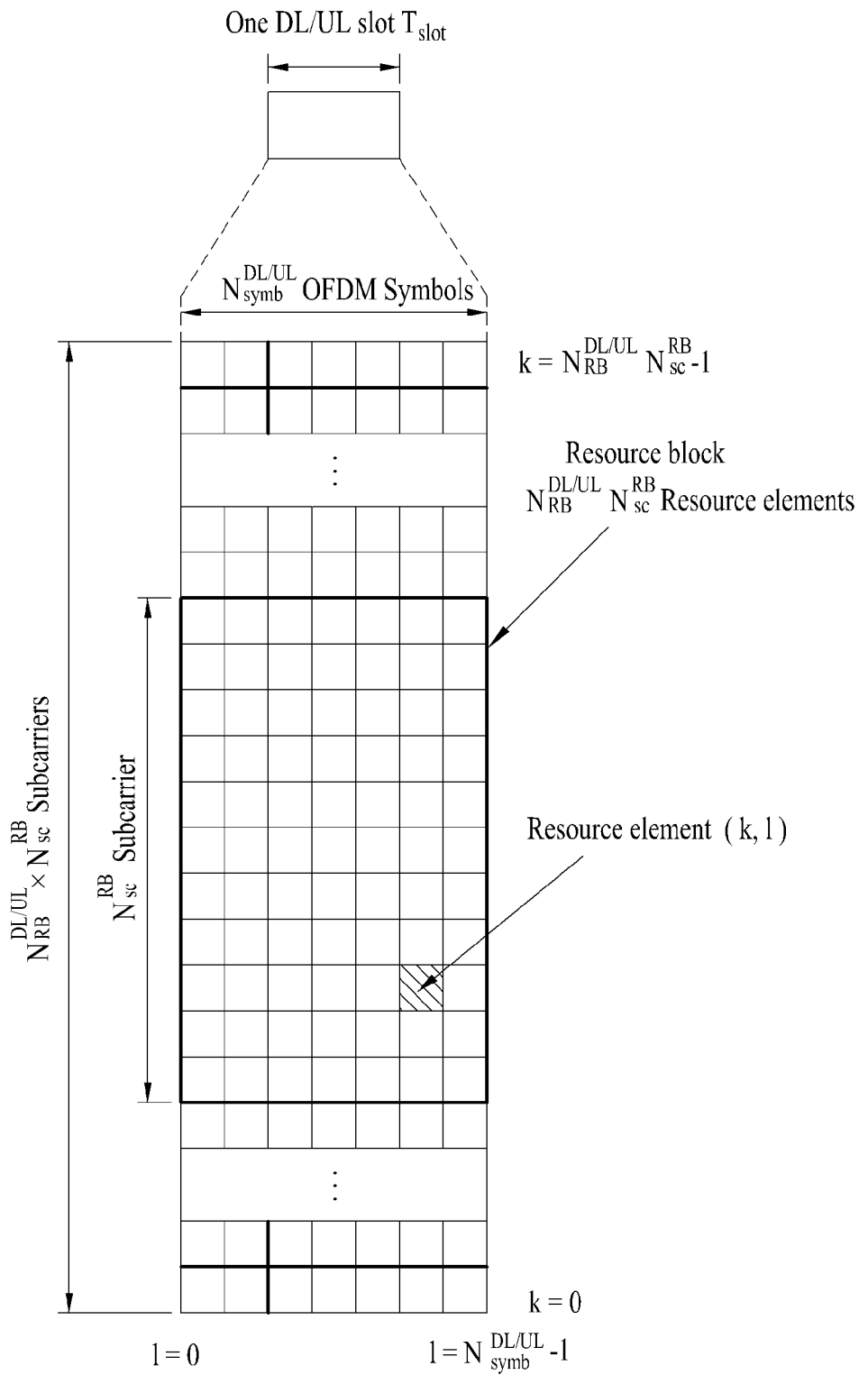
FIG. 2 illustrates an exemplary downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (ID) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
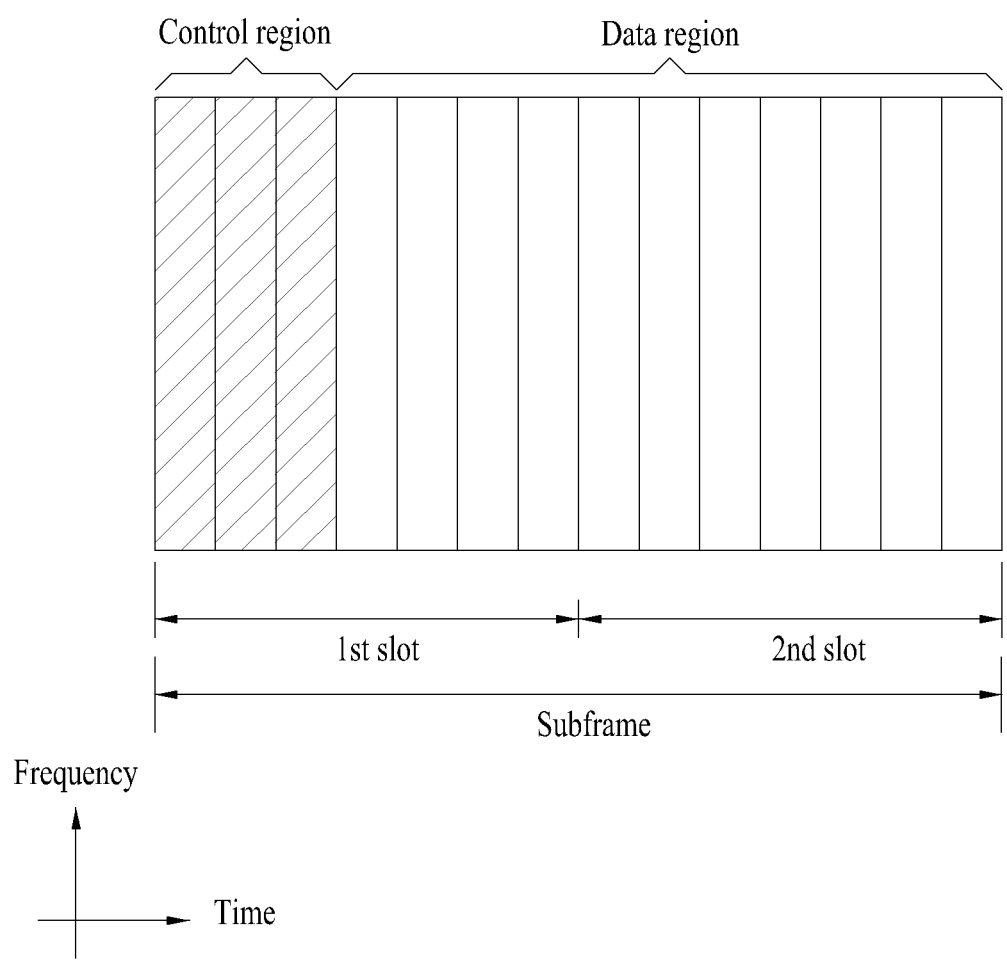
FIG. 3 illustrates a downlink subframe structure used in 3GPP LTE(-A)

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
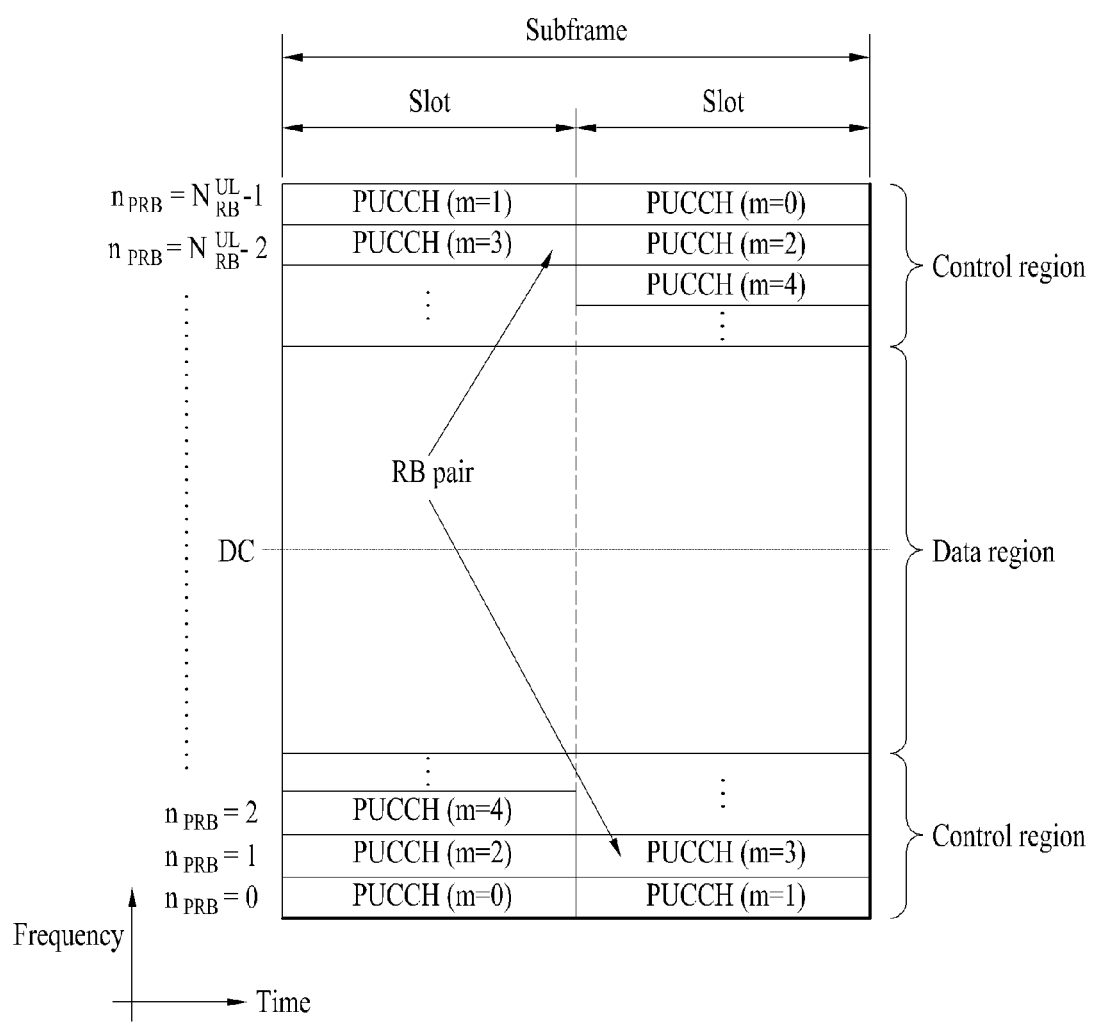
FIG. 4 illustrates an exemplary uplink subframe structure used in 3GPP LTE(-A)

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
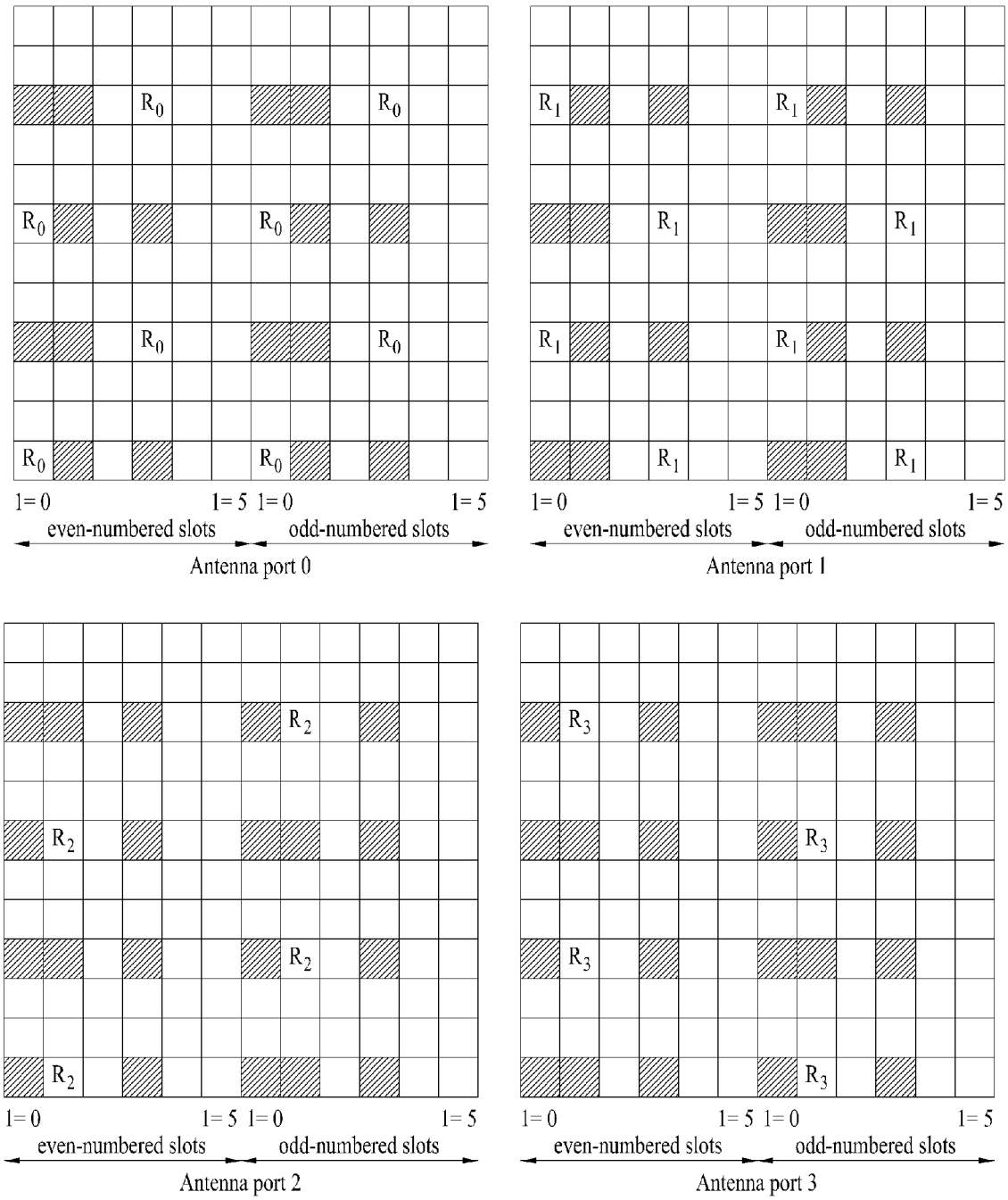
FIG. 5 illustrates cell specific reference signal mapping patterns according to antenna ports.

FIG. 5 illustrates cell specific reference signal (CRS) mapping patterns according to antenna ports. The CRS is used for obtaining channel information and demodulating data, a UE-specific reference signal is used for demodulating data. The CRS is transmitted for wideband in every subframe, and the reference signal for up to four (4) antenna ports is transmitted according to the number of the transmission antennas of the eNB.

For example, if the number of the transmission antennas of the eNB is two, the CRS for #0 and #1 antenna ports is transmitted and if the number of the transmission antennas of the eNB is four, the CRS for #0 to #3 antenna ports is transmitted.

Figure 6:
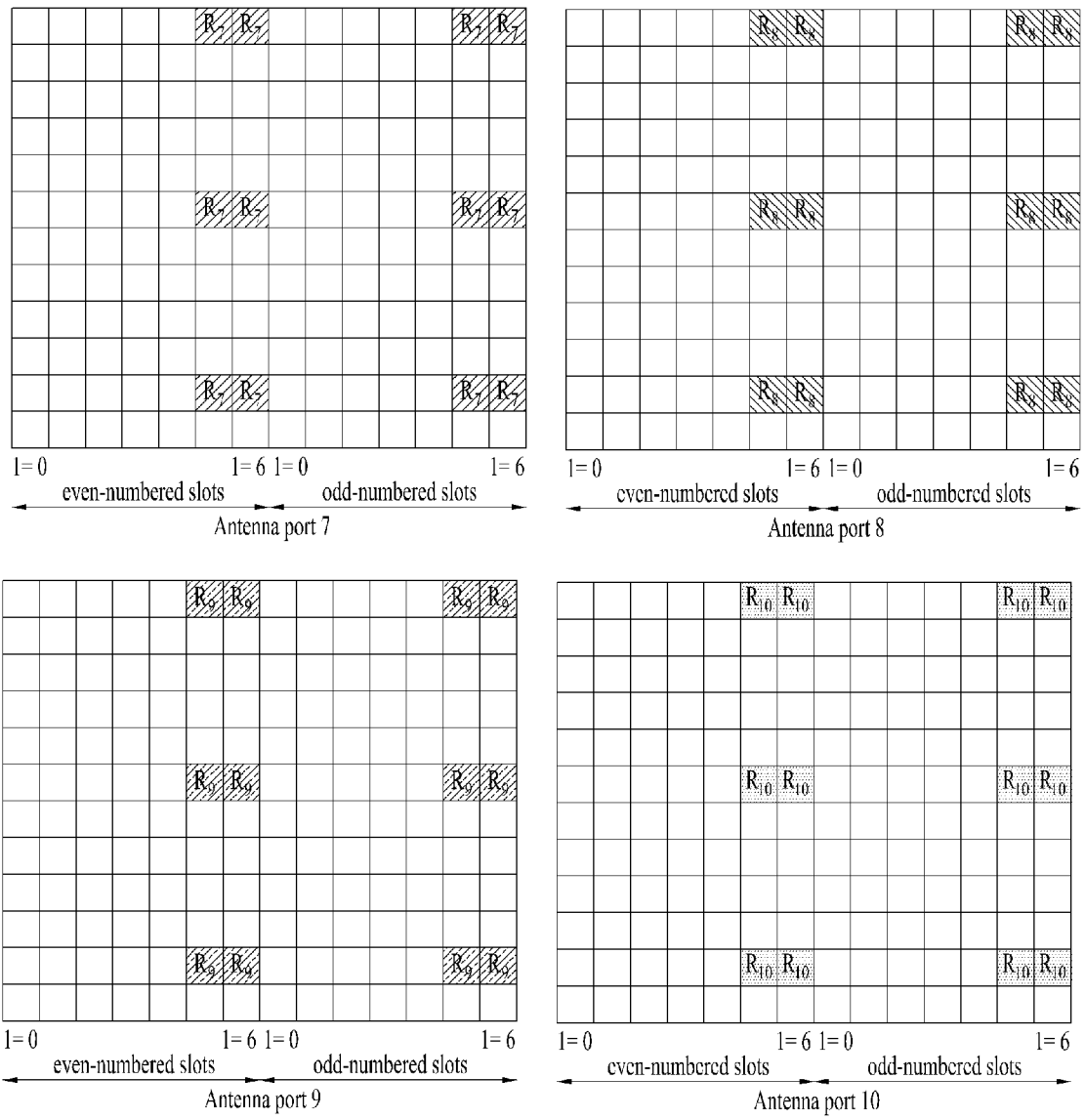
FIG. 6 illustrates demodulation reference signal mapping patterns according to antenna ports.

FIG. 6 illustrates demodulation reference signal mapping patterns according to antenna ports. A DMRS is a reference signal defined for a UE to perform channel estimation with respect to a PDSCH. The DMRS can be used in transmission modes 7, 8 and 9. The DMRS was initially defined for single layer transmission of antenna port #5 and then extended for spatial multiplexing of a maximum of 8 layers. The DMRS, which is also called a UE specific reference signal, is transmitted for a specific UE only and thus can be transmitted in an RB through which a PDSCH for the specific UE is transmitted.

Description will be given of generation of a DMRS for a maximum of 8 layers. With regard to the DMRS, a reference signal sequence r(m) generated according to Equation 1 can be mapped to complex-valued modulation symbols $a_{k,l}^{(p)}$ according to Equation 2 and transmitted. FIG. 6 illustrates mapping of the DMRS to a resource grid in a subframe with respect to antenna ports 7 to 10 in the normal CP case.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

$$m = \begin{cases} 0, 1, \ldots, 12N_{RB}^{max,DL} - 1 & \text{normal } CP \\ 0, 1, \ldots 16N_{RB}^{max,DL} - 1 & \text{extended } CP \end{cases}$$

Here, r(m) denotes the reference signal sequence, c(i) denotes a pseudo random sequence and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m') \quad \text{[Equation 2]}$$

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8 or 9} \\ l' \bmod 2 + 2 + 3\lfloor l'/2 \rfloor & \text{if in a special subframe with configuration 1, 2, 6 or 7} \\ l' \bmod 2 + 5 & \text{if not in a special subframe} \end{cases}$$

$$l'$$

$$m' = 0, 1, 2$$

As represented in Equation 2, when the reference signal sequence is mapped to complex-valued modulation symbols, an orthogonal sequence $\overline{w}_p(i)$ is applied according to antenna port, as shown in Table 3.

TABLE 3

| Antenna port p | [$\overline{w}_p(0)$ $\overline{w}_p(1)$ $\overline{w}_p(2)$ $\overline{w}_p(3)$] |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Figure 7:
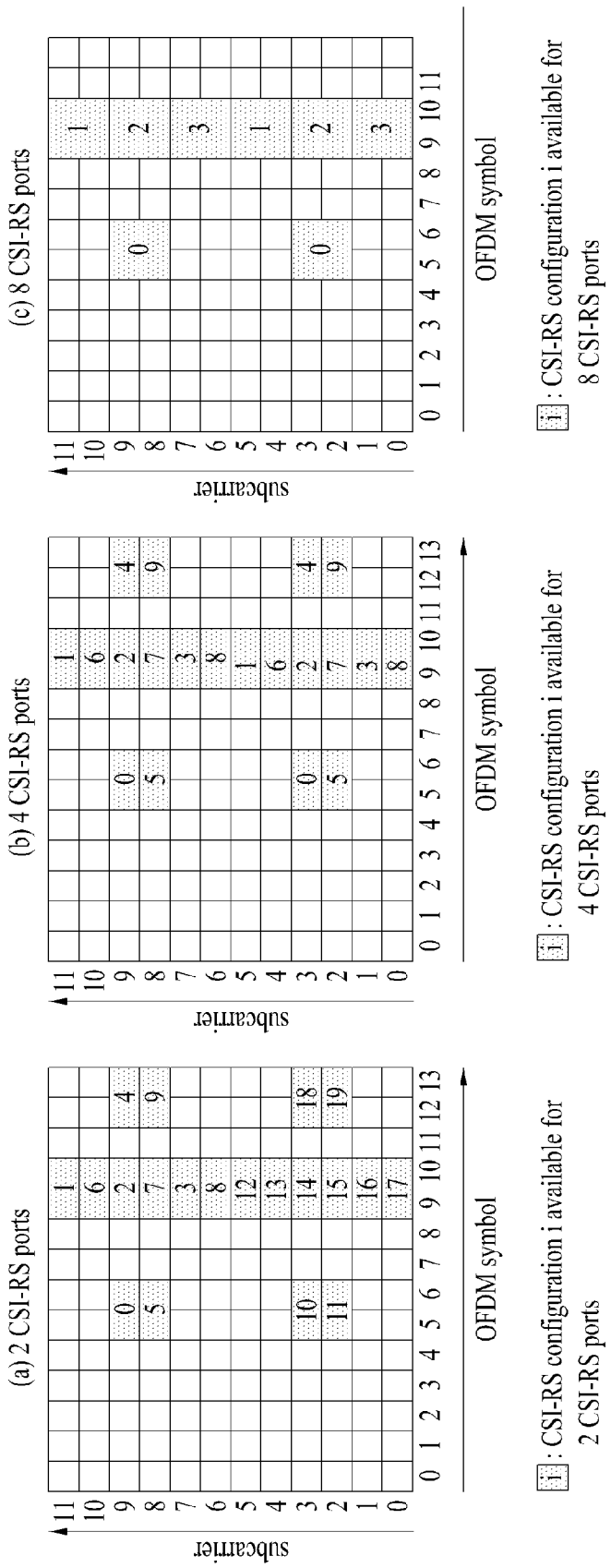
FIG. 7 illustrates channel state information reference signal mapping patterns according to antenna ports.

FIG. 7 illustrates CSI-RS mapping patterns according to antenna ports. An antenna port for CSI-RS transmission is referred to as a CSI-RS port and positions of resources in a predetermined resource region, in which CSI-RSs are transmitted through CSI-RS ports corresponding thereto, are referred to as a CSI-RS pattern or CSI-RS resource configuration. In addition, a time-frequency resource to/through which a CSI-RS is allocated/transmitted is referred to as a CSI-RS resource. For example, a resource element (RE) used for CSI-RS transmission is referred to as a CSI-RS RE. While the position of an RE through which a CRS is transmitted per antenna port is fixed, the CSI-RS has a maximum of 32 different configurations in order to reduce inter-cell interference (ICI) in a multi-cell environment including a heterogeneous network environment. A CSI-RS configuration depends on the number of antenna ports in a cell and CSI-RS configurations are set such that neighboring cells have different configurations. The CSI-RS supports up to 8 antenna ports (p=15, p=15, 16, p=15, . . . , 18 and p=15, . . . , 22), distinguished from the CRS, and is defined for Δf=15 kHz only. Antenna ports p=15, . . . , 22 may respectively correspond to CSI-RS ports p=0, . . . , 7 in the following description.

Tables 4 and 5 show CSI-RS configurations that can be used in a frame structure (referred to as FS-1 hereinafter) for FDD (frequency division duplex) and a frame structure (referred to as FS-2 hereinafter) for TDD (time division duplex). Particularly, Table 4 shows CSI-RS configurations in a subframe having the normal CP and Table 5 shows CSI-RS configurations in a subframe having the extended CP.

TABLE 4

| CSI-RS config-uration | Number of CSI-RSs configured | | | | | |
|---|---|---|---|---|---|---|
| | 1 or 2 | | 4 | | 8 | |
| | (k', l') | $n_s$mod2 | (k', l') | $n_s$mod2 | (k', l') | $n_s$mod2 |
| FS-1 and FS-2   0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| FS-2 only   20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 5

| CSI-RS config-uration | Number of CSI-RSs configured | | | | | |
|---|---|---|---|---|---|---|
| | 1 or 2 | | 4 | | 8 | |
| | (k', l') | $n_s$mod2 | (k', l') | $n_s$mod2 | (k', l') | $n_s$mod2 |
| FS-1 and FS-2   0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |

TABLE 5-continued

| CSI-RS config-uration | Number of CSI-RSs configured | | | | | |
|---|---|---|---|---|---|---|
| | 1 or 2 | | 4 | | 8 | |
| | (k', l') | $n_s$mod2 | (k', l') | $n_s$mod2 | (k', l') | $n_s$mod2 |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| FS-2 only   16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

When (k', l') (k' being a subcarrier index in a resource block and l' being an OFDM symbol index in a slot) in Tables 4 and 5 and $n_s$ ($n_s$ being a slot index in a frame) are applied to the following equation, a time-frequency resource used by each CSI-RS port to transmit a corresponding CSI-RS can be determined. That is, a CSI-RS sequence may be mapped to complex-valued modulation symbols used as reference symbols for CSI-RS port p in slot $n_s$ in a subframe (CSI-RS subframe) configured for CSI-RS transmission according to the following equation.

$$a_{k,l}^{(p)} = w_{l''} \cdot r_{l,n_s}(m'') \qquad \text{[Equation 3]}$$

In Equation 3, a resource index pair (k, l) (k being a subcarrier index and l being an OFDM symbol index in a subframe) used for CSI-RS port p for CSI-RS transmission can be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases} \qquad \text{[Equation 4]}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

-continued $$m' = m + \left\lfloor \frac{N_{RB}^{max,DL} - N_{RB}^{DL}}{2} \right\rfloor$$

FIG. 7 illustrates CSI-RS configurations. Particularly, FIG. 7 illustrates CSI-RS configurations according to Equation 3 and Table 4 and shows positions of resources occupied by CSI-RSs in one RB pair in each CSI-RS configuration.

FIG. 7(a) shows 20 CSI-RS configurations available for CSI-RS transmission through 2 CSI-RS ports, FIG. 7(b) shows 10 CSI-RS configurations available for CSI-RS transmission through 4 CSI-RS ports and FIG. 7(c) shows 5 CSI-RS configurations available for CSI-RS transmission through 8 CSI-RS ports. CSI-RS configurations defined on the basis of the number of CSI-RS ports may be numbered.

When a BS sets 2 antenna ports for CSI-RS transmission, that is, sets 2 CSI-RS ports, CSI-RS transmission is performed in a radio resource corresponding to one of the 20 CSI-RS configurations, shown in FIG. 7(a), through the 2 CSI-RS ports. When 4 CSI-RS ports are set for a specific cell, CSI-RSs are transmitted in resources corresponding to CSI-RS configurations for the specific cell from among the 10 CSI-RS configurations, shown in FIG. 7(b), through the 4 CSI-RS ports. When 8 CSI-RS ports are set for the specific cell, CSI-RSs are transmitted in resources corresponding to CSI-RS configurations for the specific cell from among the 5 CSI-RS configurations, shown in FIG. 7(c), through the 8 CSI-RS ports.

CSI-RS configurations shown in Tables 4 and 5 have a nested property. The nested property means that a CSI-RS configuration for a large number of CSI-RS ports becomes a super set of a CSI-RS configuration for a small number of CSI-RS ports. Referring to FIGS. 7(b) and 7(c), REs corresponding to CSI-RS configuration 0 with respect to 4 CSI-RS ports are included in resources corresponding to CSI-RS configuration 0 with respect to 8 CSI-RS ports.

A plurality of CSI-RSs may be used in a predetermined cell. In case of a non-zero power CSI-RS, only a CSI-RS with respect to one CSI-RS configuration is transmitted. In case of a zero power CSI-RS, a CSI-RS with respect to a plurality of CSI-RS configurations may be transmitted. A UE assumes zero transmission power for resources other than resources that need to be assumed to correspond to non-zero power CSI-RSs, from among resources corresponding to zero power CSI-RSs. For example, with regard to a radio frame for TDD, a CSI-RS is not transmitted in a special subframe in which downlink transmission and uplink transmission coexist, a subframe in which a paging message is transmitted and a subframe in which transmission of a synchronization signal, a physical broadcast channel (PBCH) or system information block type 1 (SIB1) collide with a CSI-RS, and the UE assumes that a CSI-RS is not transmitted in these subframes. A time-frequency resource used for a CSI-RS port to transmit the corresponding CSI-RS is not used for PDSCH transmission through any antenna port and is not used for CSI-RS transmission through an antenna port other than the corresponding CSI-RS port.

Since time-frequency resources used for CSI-RS transmission cannot be used for data transmission, data throughput decreases as CSI-RS overhead increases. In view of this, a CSI-RS is configured to be transmitted at a predetermined transmission interval corresponding to a plurality of subframes rather than being configured to be transmitted per subframe. In this case, CSI-RS transmission overhead can be remarkably reduced compared to a case in which the CSI-RS is transmitted per subframe. In the following description, a subframe configured for CSI-RS transmission is referred to as a CSI-RS subframe. A subframe configured for CSI-RS transmission may be defined by CSI-RS transmission periodicity and subframe offset. The CSI-RS transmission periodicity and subframe offset are referred to as a CSI-RS subframe configuration. Table 6 shows CSI-RS transmission periodicity $T_{CSI-RS}$ and subframe offset $\Delta_{CSI-RS}$.

TABLE 6

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
| --- | --- | --- |
| $I_{CSI-RS} \leq 4$ | 5 | $I_{CSI-RS}$ |
| $5 \leq I_{CSI-RS} \leq 14$ | 10 | $I_{CSI-RS}-5$ |
| $15 \leq I_{CSI-RS} \leq 34$ | 20 | $I_{CSI-RS}-15$ |
| $35 \leq I_{CSI-RS} \leq 74$ | 40 | $I_{CSI-RS}-35$ |
| $75 \leq I_{CSI-RS} \leq 154$ | 80 | $I_{CSI-RS}-75$ |

In Table 6, $I_{CSI-RS}$ specifies CSI-RS transmission periodicity and subframe offset.

The BS may determine or adjust $I_{CSI-RS}$ and transmit $I_{CSI-RS}$ to UEs within the coverage of the corresponding cell. A UE may be aware of a CSI-RS subframe in which a CSI-RS of the cell (referred to as a serving cell, hereinafter) that provides communication services to the UE is transmitted on the basis of $I_{CSI-RS}$. The UE may determine a subframe which satisfies the following equation as a CSI-RS subframe.

$$(10n_f + \lfloor n_s/2 \rfloor - \Delta_{CSI-RS}) \bmod T_{CSI-RS} = 0 \quad \text{[Equation 5]}$$

Here, $n_f$ denotes a system frame number and $n_s$ represents a slot number of a radio frame.

For example, referring to Table 6, when $I_{CSI-RS}$ is greater than 5 and less than 14, a CSI-RS is transmitted every 10 subframes, starting from a subframe corresponding to a subframe number $I_{CSI-RS}-5$.

The BS may notify the UE of the following parameters through higher layer signaling (e.g. medium access control (MAC) signaling or radio resource control (RRC) signaling).

Number of CSI-RS ports
CSI-RS configuration (refer to Tables 4 and 5, for example)
CSI-RS subframe configuration (refer to Table 6, for example)
CSI-RS subframe configuration periodicity $T_{CSI-RS}$
CSI-RS subframe offset $\Delta_{CSI-RS}$ The BS may notify the UE of a CSI-RS configuration transmitted with zero power and a subframe configuration for transmission of a zero power CSI-RS as necessary. The CSI-RS configurations of Tables 5 and 6 may be used as the zero power CSI-RS configuration and the CSI-RS subframe configuration of Table 6 may be used as the subframe configuration for transmission of the zero power CSI-RS.

Figure 8:
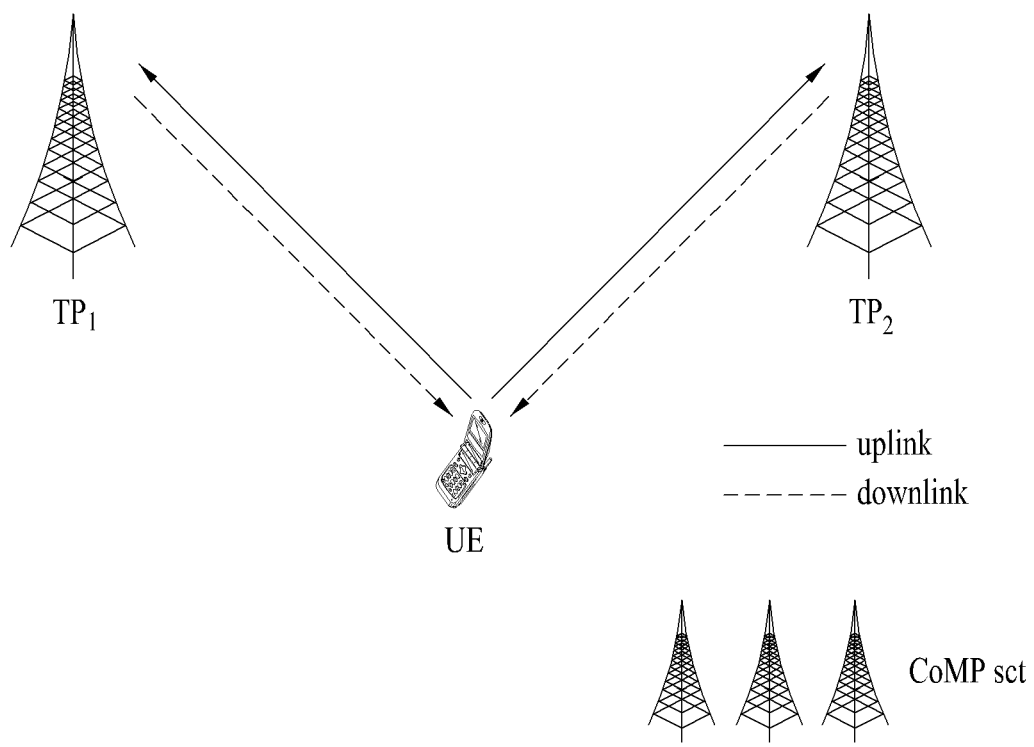
FIG. 8 illustrates an exemplary multi-point transmission/reception operation.

FIG. 8 illustrates a wireless communication system in which a CoMP set provides a joint transmission (JT) service to a UE. That is, the UE is set to transmission mode 10. Downlink operations with respect to the CoMP set include not only JT but also dynamic cell selection (DCS) configured to transmit a downlink signal from a cell (or a transmission point, for example, a BS or eNB) to a UE at one timing and coordinated scheduling/beamforming (CS/CB) configured to perform scheduling or beamforming to minimize interference applied by a UE to a plurality of cells belonging to the CoMP set JT.

In FIG. 8, the UE receives data from all transmission points (TPs) belonging to the CoMP set, for example, $TP_1$ and TP$_2$ and may transmit channel state information about all TPs belonging to the CoMP set. In this case, RSs may be transmitted to the UE from a plurality of TPs in the CoMP set. If characteristics for channel estimation with respect to different RS ports of different TPs can be shared, then reception processing load and complexity of the UE may be reduced. In addition, if characteristics for channel estimation with respect to different RS ports of the same TP can be shared by the RS ports, then reception processing load and complexity of the UE may be decreased. Accordingly, a description will be given of a method of sharing characteristics for channel estimation between RS ports.

Prior to description of embodiments of the present invention, a new concept applied to all embodiments is defined. The wording "quasi co-located (QCL)" indicated in the specification is described. With regard to two antenna ports, for example, if a large-scale property of a radio channel on which a symbol is transmitted through one of the antenna ports can be inferred from a radio channel on which a symbol is transmitted through the other antenna port, then the two antenna ports can be considered to be quasi-co-located. The large-scale property includes at least one of delay spread, Doppler spread, Doppler shift, average gain and average delay. The term "quasi-co-located" will now be referred to as QCL.

That is, when two antenna ports are QCL, this means that the large-scale property of a radio channel from one antenna port corresponds to the large-scale property of a radio channel from the other antenna port. Considering a plurality of antenna ports through which RSs are transmitted, when antenna ports through which RSs of two different types are transmitted are QCL, the large-scale property of a radio channel from one antenna port may be replaced by the large-scale property of a radio channel from the other antenna port.

According to the concept of quasi-co-location (QCL), the UE cannot assume the same large-scale property for radio channels from non-QCL antenna ports. In this case, the UE needs to perform independent processing per non-QCL antenna port for timing acquisition and tracking, frequency offset estimation and compensation, delay estimation and Doppler estimation, etc.

For antenna ports for which QCL can be assumed, the UE can perform the following operations.

With regard to delay spread and Doppler spread, the UE may equally apply a power-delay-profile, delay spread and Doppler spectrum and Doppler spread estimation result with respect to a radio channel from one antenna port to a Wiener filter used for channel estimation with respect to a radio channel from the other antenna port.

With regard to frequency shift and received timing, the UE may perform time and frequency synchronization for one antenna port and then apply the same synchronization to demodulation with respect to the other antenna port.

For average reception power, the UE may average RSRP (reference signal received power) measurement for two or more antenna ports.

Upon reception of a specific DMRS-based DL-related DCI format through a control channel (PDCCH or ePDCCH), the UE performs channel estimation with respect to a corresponding PDSCH through a DMRS sequence and then performs data demodulation. For example, if the UE can assume QCL between a configuration of antenna ports (referred to as "DMRS ports" hereinafter) for transmission of a DMRS, received through a DL scheduling grant, and a configuration of antenna ports (referred to as "CRS ports" hereinafter) for transmission of a CRS of the DL serving cell of the UE or another cell, then the UE may apply an estimate of the large-scale property of a radio channel, which has been estimated from the CRS ports, to channel estimation through the DMRS ports, thereby improving performance of a processor of a DMRS-based receiver.

Since the CRS is a reference signal that is broadcast with high density per subframe and over the entire band, as described above, the estimate of the large-scale property can be acquired from the CRS more stably. On the contrary, the DMRS is UE-specifically transmitted for a specific scheduled RB and a precoding matrix used by an eNB for transmission may be changed per PRG, and thus a valid channel received by the UE may be changed per PRG. Accordingly, performance deterioration may occur when the DMRS is used to estimate the large-scale property of a radio channel over a wide band even if a plurality of PRGs is scheduled for the UE. The CSI-RS has a transmission period of several to ten ms and is transmitted with as low density as 1 RE (2 REs when CDM is applied) per antenna port per RB. Thus, performance deterioration may occur when the CSI-RS is used to estimate the large-scale property of the radio channel.

That is, QCL assumption between antenna ports may be used for reception of downlink reference signals, channel estimation, channel state reporting, etc.

Embodiments of the present invention provide a method for signaling, by an eNB, information on QCL assumption among downlink RSs such as DMRS, CRS, CSI-RS, etc., that is, information indicating QCL between at least two antenna ports to a UE, thereby improving CSI feedback performance of the UE and receiver processing performance. In embodiments of the present invention, the UE is preferably set or operates in transmission mode 10.

<QCL Between Different RS Ports Based on CSI-RS Resource Configuration Information>

QCL assumption between different RS ports may be indicated through a CSI-RS resource configuration according to an embodiment of the present invention. For example, QCL assumption between CSI-RS ports and CRS ports can be indicated.

When one or more CSI-RS resource configurations are set for the UE through RRC, the UE may receive information indicating whether QCL can be assumed between each CSI-RS port and a specific RS port per CSI-RS resource configuration. The UE calculates channel state information (CSI) to be reported during CSI reporting with respect to each CSI-RS resource configuration, for example, CQI, RI, PMI, etc. on the basis of QCL or non-QCL (NQCL) assumption.

A CSI-RS resource configuration used in an embodiment of the present invention may include the following parameters or information.

CSI-RS resource configuration identity
Number of CSI-RS ports
CSI-RS configuration (refer to Tables 4 and 5, for example)
CSI-RS subframe configuration (refer to Table 6, for example)
Reference PDSCH transmission power for CSI feedback with respect to each CSI process and assumption of the UE with respect to Pc
Sequence scrambling identity (or initial value) as a pseudo-random sequence generator parameter
Assumption that CRS antenna ports and CSI-RS antenna ports are QCL with the following parameters Cell ID for quasi-co-located CRS
Number of CRS antenna ports for quasi-co-located CRS
MBSFN subframe configuration for quasi-co-located CRS More specifically, when one or more CSI-RS resource configurations belonging to a CoMP measurement set are set for the UE through RRC, the UE may receive information indicating whether QCL with respect to CRS ports from a specific cell can be assumed per CSI-RS resource configuration. Then, the UE calculates CQI, RI, PMI, etc. to be reported during CSI reporting for each CSI-RS resource configuration on the basis of QCL or NQCL assumption. That is, when QCL assumption between a first CSI-RS port corresponding to a CSI-RS resource configuration from a first cell and a CRS port from a second cell is signaled, the UE may use the large-scale property of the radio channel, which has been estimated from the CRS port, for calculation of CSI corresponding to the first CSI-RS without acquiring the large-scale property of the radio channel from the CSI-RS port.

For example, when one or more CSI-RS resource configurations are set for the UE through RRC, the UE may be informed of an identifier of a CRS for which QCL will be assumed for each CSI-RS resource configuration. In calculation of CQI, RI, PMI, etc. for reporting of CSI corresponding to each CSI-RS resource configuration, the UE may calculate and report CSI, which can accomplish 10% FER (frame error rate) during data demodulation, on the assumption that a corresponding DMRS port and a CRS port signaled from a cell identified by a predetermined ID, are QCL during reception of a DMRS-based PDSCH.

Alternatively, whether QCL can be assumed between CSI-RS ports and CRS ports may be implicitly indicated according to whether scrambling ID for a CSI-RS, included in each CSI-RS configuration, corresponds to a cell ID (or scrambling identifier or physical cell identifier) of specific CRS ports.

Alternatively, when a first CSI-RS resource configuration (referred to as "CSI-RS resource configuration #1" hereinafter) and a second CSI-RS resource configuration (referred to as "CSI-RS resource configuration #2 hereinafter) are set for the UE, CSI-RS resource configuration #1 is assumed or set to be QCL with respect to CRS ports from a specific cell (e.g. DL serving cell) and CSI-RS resource configuration #2 is assumed or set to be NQCL with respect to the CRS ports, the UE may calculate and report an MCS level, CQI, RI and PMI, which can accomplish 10% FER during data demodulation, on the assumption that corresponding DMRS ports and CRS ports from the corresponding cell (e.g. DL serving cell) are QCL when receiving a DMRS-based PDSCH, in calculation of CSI with respect to a specific CSI-RS resource configuration (i.e. CSI-RS resource configuration #1) for which QCL with respect to the corresponding cell (e.g. DL serving cell) can be assumed. In addition, the CQI may be calculated by applying a specific scaling value to the ratio Pc of PDSCH EPRE (energy per resource element) to CSI-RS EPRE, included in a CSI-RS resource configuration. Since CSI-RS resource configuration #2 is set to NQCL, the UE cannot assume QCL with respect to the CRS ports from the corresponding cell (e.g. DL serving cell) upon receiving the DMRS-based PDSCH from the cell that has transmitted the second CSI-RS. Accordingly, the UE may calculate and report the MCS level, CQI, RI and PMI, which can achieve 10% FET during data demodulation, without QCL assumption. For example, the UE can calculate and report CSI corresponding to a lower value compared to a case in which QCL can be assumed.

<QCL Between Different CSI-RS Ports Based on CSI-RS Resource Configuration Information>

According to another embodiment of the present invention, one CSI-RS resource configuration may include information indicating whether QCL/NQCL with respect to CSI-RS ports corresponding to another CSI-RS resource configuration is assumed.

For example, ID information may be included in each CSI-RS resource configuration such that QCL can be assumed between CSI-RS ports having the same ID I information. That is, QCL can be assumed between CSI-RS ports having the same ID information corresponding to N bits. In a representative embodiment, when an eNB uses L*M panel antennas for 3D beamforming, quasi-co-location of a plurality of CSI-RS resource configurations set in the eNB is indicated such that CSI-RS ports in this QCL relationship can share all or some estimates of the large-scale property, thereby reducing processing load and complexity of the UE receiver. QCL assumption may be excluded for an average gain included in the large-scale property in terms of 3D beamforming gain.

According to another embodiment, when one or more CSI-RS resource configurations are set for the UE, a specific flag bit may be added to each CSI-RS resource configuration such that the CSI-RS resource configuration is recognized as a CSI-RS resource configuration group for which QCL can be assumed whenever the flag bit is toggled. That is, when 5 CSI-RS resource configurations (e.g. CSI-RS resource configuration #1, CSI-RS resource configuration #2, . . . , CSI-RS resource configuration #5) are set for the UE, the flag bit is 0 for CSI-RS resource configuration #1 and CSI-RS resource configuration #2 and 1 for CSI-RS resource configuration #3 and CSI-RS resource configuration #4, and the flag bit is toggled to 0 for CSI-RS resource configuration #5, this indicates that QCL can be assumed between CSI-RS resource configuration #1 and CSI-RS resource configuration #2, QCL can be assumed between CSI-RS resource configuration #3 and CSI-RS resource configuration #4 and QCL can be assumed with respect to CSI-RS resource configuration #5 alone, and thus NQCL may be indicated for CSI-RS resource configuration #5 since QCL cannot be assumed with respect to other CSI-RS resource configurations for CSI-RS resource configuration #5.

According to another embodiment of the present invention, QCL/NQCL assumption may be indicated according to whether CSI-RS resource configurations have the same CSI-RS sequence scrambling seed value X (e.g. physical cell ID, virtual cell ID, scrambling ID or initial value) which is included in each CSI-RS resource configuration. It is possible to implicitly indicate that QCL can be assumed between CSI-RS ports corresponding to CSI-RS resource configurations including the same X value. On the contrary, NQCL can be assumed between CSI-RS ports corresponding to CSI-RS resource configurations including different X values.

The value X may be allocated per CSI-RS port included in each CSI-RS resource configuration. In this case, QCL or NQCL assumption may be implicitly indicated according to whether CSI-RS ports have the same X value.

According to another embodiment of the present invention, when higher layer signaling indicating that QCL can be assumed between CRS ports from specific cell A and a specific CSI-RS resource configuration is transmitted to the UE, the UE may perform processing on the assumption that some or all CRS ports from cell A and all CSI-RS ports in the corresponding CSI-RS resource configuration are quasico-located and determine that CSI-RS ports corresponding to the CSI-RS resource configuration can be assumed to be quasi-co-located. On the contrary, when higher layer signaling indicating that QCL cannot be assumed (NQCL) between the CRS ports from specific cell A and the specific CSI-RS resource configuration is transmitted to the UE, the UE may perform processing without assuming quasi-co-location of some or all CRS ports from cell A and all CSI-RS ports in the corresponding CSI-RS resource configuration and determine that CSI-RS ports corresponding to the CSI-RS resource configuration cannot be assumed to be quasi-co-located.

According to another embodiment of the present invention, higher layer signaling indicating that QCL can be assumed only between CRS ports from specific cell A and some CSI-RS ports in a specific CSI-RS resource configuration may be transmitted to the UE. In this case, the UE may perform processing on the CSI-RS ports for which QCL can be assumed, from among CSI-RS ports corresponding to the specific CSI-RS resource configuration, through QCL assumption between the CSI-RS ports and the CRS ports. In addition, the UE may determine that remaining CSI-RS ports other than the CSI-RS ports for which QCL can be assumed cannot be assumed to be quasi-co-located and determine that the remaining CSI-RS ports are not assumed to be quasi-co-located with respect to the CRS ports. With regard to CRS ports from another cell B, information about a specific CSI-RS resource configuration may be transmitted through higher layer signaling.

According to another embodiment of the present invention, information bits indicating whether QCL can be assumed between CSI-RS ports in each CSI-RS resource configuration may be added to each CSI-RS resource configuration and transmitted. For example, the information bits may be added to higher layer signaling and transmitted. Specifically, the information bits may be included in each CSI-RS resource configuration. That is, information bits indicating whether QCL can be assumed between CSI-RS ports in a specific CSI-RS resource configuration belonging to a CoMP measurement set (a set of TPs that will perform CoMP operation (e.g. DPS, JT, CS/CB, etc.) or a set of CSI-RS resource configurations related to corresponding TPs) may be included in the corresponding CSI-RS resource configuration and transmitted. When a UE to which signals are transmitted from TP A and TP B through JT is present, three CSI-RS resource configurations corresponding to CSI-RS resource configurations #1, #2 and #3 may be transmitted to the UE. In this case, CSI-RS resource configuration #1 may be a CSI-RS resource configuration transmitted from TP A, CSI-RS resource configuration #2 may be a CSI-RS resource configuration transmitted from TP B and CSI-RS resource configuration #3 may be a CSI-RS resource configuration obtained by extracting some specific ports from CSI-RS resource configurations #1 and #2 respectively corresponding to TP A and TP B and combining the extracted ports. For example, CSI-RS resource configuration #3 corresponds to a 2-port CSI-RS resource configuration generated by combining specific CSI-RS port #1 corresponding TP A and specific CSI-RS port #1 corresponding to TP B. When the UE receives CSI-RS resource configurations #1, #2 and #3 and performs CSI feedback (e.g. RI/PMI/CQI feedback) with respect to each CSI-RS resource configuration, CSI reports for CSI-RS resource configurations #1 and #2 respectively correspond to CSI reports for TP A and TP B and a CSI report for CSI-RS resource configuration #3 may be used for transmission of inter-cell CSI capable of carrying information such as a phase difference between a channel from TP A and a channel from TP B when JT is performed by TP A and TP B. To perform the aforementioned operation, the eNB may indicate that QCL can be assumed between corresponding CSI-RS ports in CSI-RS resource configuration #1, indicate that QCL can be assumed between corresponding CSI-RS ports in CSI-RS resource configuration #2 and indicate that QCL cannot be assumed (NQCL) between corresponding CSI-RS ports in CSI-RS resource configuration #3. Since CSI-RS resource configuration #3 is generated by combining specific CSI-RS ports of TP A and TP B, as described above, NQCL information needs to be signaled because the CSI-RS ports may be geographically separated. Accordingly, the UE should not share estimates of the large-scale property between ports corresponding to CSI-RS resource configuration #3, and thus the UE estimates the estimates (e.g. delay spread, Doppler spread, Doppler shift, average gain, average delay, etc.) of the large-scale property per port. While the embodiment in which TP A and TP B are present has been described, it is apparent that the method provided by the present invention can be applied to a larger or smaller number of TPs.

In addition, information bits indicating whether QCL can be assumed between CSI-RS ports in each CSI-RS resource configuration in a CoMP resource management (CRM) set may be additionally transmitted through higher layer signaling per CSI-RS resource configuration in the CRM set. For example, the information bits may be included in each CSI-RS resource configuration. When the information bits are included in each CSI-RS resource configuration in the CRM set, it is possible to flexibly set whether CSI-RS ports corresponding to each CSI-RS resource configuration can share the estimates of the large-scale property.

The aforementioned example is not limited to CSI-RS resource configurations included in a specific CoMP measurement set and a specific CRM set and may be applied to general CSI-RS or RS resource configurations which are not included in the specific sets in the following manner.

Information bits indicating whether QCL can be assumed between RS ports in each RS (e.g. CSI-RS, CRS, SRS or tracking RS (TRS)) resource configuration may be additionally transmitted to the UE through higher layer signaling. Upon reception of information bits indicating that QCL can be assumed between the corresponding RS ports, the UE may average or share estimates of the large-scale property between the corresponding RS ports. When the information bits are not received, the UE may not share or average the estimates of the large-scale property between the RS ports.

<QCL Between CSI-RS Ports and DMRS Ports Based on CSI-RS Resource Configuration Information>

According to an embodiment of the present invention, a CSI-RS resource configuration may include information indicating QCL/NQCL between CSI-RS ports and DMRS ports.

For example, whether QCL/NQCL with respect to specific DMRS ports is assumed may be designated per CSI-RS resource configuration through RRC. When the UE receives CSI-RS resource configuration #1 for which QCL with respect to all DMRS ports can be assumed, the UE may equally apply specific estimates of the large-scale property, assumed in CSI-RS resource configuration #1, to reception processing for receiving a DMRS-based PDSCH. This may mean that the eNB will transmit a PDSCH from a TP that has transmitted CSI-RS resource configuration #1 to the UE for a while as long as reconfiguration is not performed. Particularly, when plural TPs simultaneously transmit CRSs as in CoMP scenario 4, it is difficult to assume TP-specific QCL through the CRSs. Accordingly, DMRS-based reception processing performance is improved by indicating information about DMRS ports for which QCL assumption with respect to CSI-RS ports is set.

For example, when the UE receives two CSI-RS resource configurations corresponding to CSI-RS resource configuration #1 and CSI-RS resource configuration #2, CSI-RS resource configuration #1 is set such that QCL with respect to CRS ports of a specific cell (e.g. DL serving cell) can be assumed whereas CSI-RS resource configuration #2 is set such that NQCL with respect to the CRS ports of the specific cell (e.g. DL serving cell) can be assumed, the UE may determine that QCL can be assumed between DMRS ports and CSI-RS resource configuration #1 and the CRS ports of the corresponding cell (e.g. DL serving cell). This is because the UE may calculate and report a higher MCS level and CSI such as a CQI during CSI feedback based on CSI-RS resource configuration #1, as described above, since CSI-RS resource configuration #1 is set such that QCL with respect to the CRS ports of the corresponding cell (e.g. DL serving cell) can be assumed. Accordingly, once the eNB sets CSI-RS resource configuration #1 such that QCL can be assumed between CSI-RS ports and the CRS ports of the corresponding cell (e.g. DL serving cell), the TP which has transmitted CSI-RS resource configuration #1 will transmit a DMRS-based PDSCH during scheduling of the corresponding UE as long as reconfiguration is not performed. Accordingly, the UE calculates and reports CSI based on CSI-RS resource configuration #1 for which QCL is assumed and receives the PDSCH through reception processing for which QCL is assumed, thereby achieving performance improvement. That is, when any one of CSI-RS resource configurations in a CoMP measurement set is permitted to be quasi-co-located with respect to CRS ports of a specific cell (e.g. DL serving cell), the UE may determine that QCL between corresponding DMRS ports and the CRS ports (CSI-RS ports for which QCL is assumed) of the corresponding cell (e.g. DL serving cell) can be assumed during DMRS-based PDSCH demodulation. That is, reception processing according to QCL assumption is permitted and CSI corresponding to a case in which reception processing according to QCL assumption is assumed on is reported.

On the contrary, when all CSI-RS resource configurations in the CoMP measurement set are set to NQCL assumption with respect to the CRS ports of the specific cell (e.g. DL serving cell), the UE may determine that NQCL assumption between the corresponding DMRS port and the CRS ports of the corresponding cell (e.g. DL serving cell) is implicitly and semi-statically indicated during DMRS-based PDSCH demodulation. In this case, the UE is not permitted to perform operation considering QCL assumption with respect to any RS port and needs to report CSI corresponding to a case in which reception processing according to NQCL assumption is assumed.

In addition, according to another embodiment of the present invention, specific subframe index information is included in each CRS-RS resource configuration. In this case, when DMRS-based DL scheduling is performed, whether QCL/NQCL can be assumed between corresponding DMRS ports and CSI-RS ports indicated by each CSI-RS resource configuration may be designated for a corresponding subframe through RRC. Furthermore, information indicating whether QCL/NQCL can be assumed between the DMRS ports and CRS ports of a specific cell (e.g. DL serving cell) may be included in each CSI-RS resource configuration. For example, when CSI-RS resource configuration #1 is set such that QCL with respect to the DMRS ports can be assumed in subframes having even-numbered indices, the UE may equally apply some or all estimates of the large-scale property, which are assumed in the CRS ports of CSI-RS resource configuration #1 (and/or the corresponding cell (e.g. DL serving cell)), to reception processing for receiving a DMRS-based PDSCH in the subframes having even-numbered indices. When this information is applied to CSI reporting, the UE may calculate CSI (e.g. an MCS level, CQI, RI and PMI corresponding thereto, which can accomplish 10% FER when the UE receives a DMRS-based PDSCH and demodulates data on the assumption that QCL/NQCL is assumed between corresponding DMRS ports and CRS ports of CSI-RS resource configuration #1 (and/or the corresponding cell (e.g. DL serving cell)) which considers whether QCL/NQCL is assumed and report CSI in case of QCL assumption and/or CSI in case of NQCL assumption. This information may be provided in the form of a specific subframe bitmap or a subframe index set. For example, subframe set #1 may be set such that QCL can be assumed between the DMRS ports and the CRS ports of the specific cell (e.g. DL serving cell) whereas subframe set #2 may be set such that QCL can be assumed between the DMRS ports and specific CSI-RS ports. In another embodiment, subframe set #1 may be set such that QCL can be assumed between the DMRS ports and the CRS ports of the specific cell (e.g. DL serving cell) whereas subframe set #2 may be set such that NQCL can be assumed between the DMRS ports and specific CSI-RS ports.

<QCL Between CSI-RS Ports and DMRS Ports Through Higher Layer Signaling and/or DCI>

In another embodiment of the present invention, information about pairs of CSI-RS ports and DMRS ports for which QCL can be assumed, information about pairs of CRS ports and CSI-RS ports for which QCL can be assumed or information about pairs of CRS ports and DMRS ports for which QCL can be assumed may be configured as a plurality of states in a quasi-static manner through higher layer signaling such as RRC signaling and one of the states may be dynamically indicated when a scheduling grant is provided through DCI.

Similarly to aperiodic CSI (A-CSI) and aperiodic SRS (A-SRS) triggering, one of the plurality of states is triggered with N bits (e.g. N=2). Each state may pre-set pairs for which QCL can be assumed between RS ports (e.g. "CSI-RS/DMRS ports", "CRS/CSI-RS ports", "CRS/DMRS ports", etc.) set through RRC, and dynamically trigger the pairs. For example, when N=2, state "00" may be set to NQCL (i.e. QCL of DMRS ports cannot be assumed with respect to any RS port), state "01" may indicate that QCL can be assumed between DMRS ports and CRS ports of a specific cell (e.g. DL serving cell), state "10" may correspond to QCL pair information (e.g. "CSI-RS/DMRS ports" or "CRS/DMRS ports") between RSs in a first set, which is set through RRC, and state "11" may correspond to QCL pair information (e.g. "CSI-RS/DMRS ports" or "CRS/DMRS ports") of a second set, which is set through RRC. In this case, the QCL pair information between RSs in the first set, which is set through RRC, may indicate that QCL can be assumed between DMRS ports and CSI-RS ports included in {CSI-RS resource configuration #1, CSI-RS resource configuration #2} and the QCL pair information between RSs in the second set, which is set through RRC, may indicate that QCL can be assumed between DMRS ports and CRS ports of the specific cell (e.g. DL serving cell).

In another embodiment of the present invention, "QCL pair information between CRS ports and DMRS ports" may be set in a quasi-static manner according to higher layer signaling such as RRS signaling without dynamic indication through DCI. That is, when the UE receives this RRC signaling, the UE may perform reception processing on the basis of whether QCL/NQCL with respect to CRS ports of the specific cell (e.g. DL serving cell) is assumed during data demodulation based on RSs from corresponding DMRS ports when a DMRS-based PDSCH is scheduled for the UE. In addition, in a transmission mode in which CSI feedback is performed based on CRS and data demodulation is performed based on DMRS, the UE may report the corresponding CSI (e.g. an MCS level, CQI, RI and PMI corresponding thereto, which can accomplish 10% FER when the UE receives a DMRS-based PDSCH and demodulates data on the assumption that QCL/NQCL is assumed between the corresponding DMRS ports and CRS ports of the corresponding cell (e.g. DL serving cell) on the basis of the "QCL pair information between CRS ports of the specific cell (e.g. DL serving cell) and DMRS ports" set through RRC.

Figure 9:
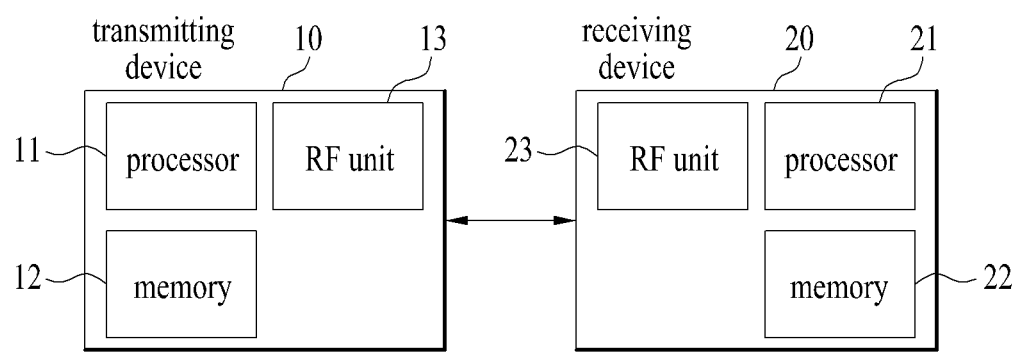
FIG. 9 is a block diagram of components of a transmitter and a receiver for implementing the present invention.

FIG. 9 is a block diagram of a transmitting device 10 and a receiving device 20 configured to implement exemplary embodiments of the present invention.

Referring to FIG. 9, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), base station (BS), or other devices.

The invention claimed is:

1. A method for receiving, by a mobile terminal, a channel state information (CSI)-reference signal (RS) in a wireless communication system, the method comprising:
receiving CSI-RS resource configuration information through higher layer signaling and receiving the CSI-RS according to the CSI-RS resource configuration information;
deriving CSI based on the CSI-RS; and
reporting the derived CSI to a base station,
wherein the CSI-RS resource configuration information includes information on one or more cell specific-RS (CRS) antenna ports assumed to be quasi-co-located with one or more antenna ports used to transmit the CSI-RS.

2. The method according to claim 1, wherein the information on the one or more CRS antenna ports is used to acquire a large-scale property of a radio channel from the one or more antenna ports used to transmit the CSI-RS.

3. The method according to claim 2, wherein the large-scale property of the radio channel from the one or more antenna ports used to transmit the CSI-RS is derived from a radio channel from an antenna port used to transmit the CRS.

4. The method according to claim 2, wherein the large-scale property of the radio channel includes at least one of delay spread, Doppler spread, Doppler shift, average gain and average delay.

5. The method according to claim 1, wherein the information on the one or more CRS antenna ports includes identification information about the CRS.

6. The method according to claim 1, wherein the mobile terminal is configured in transmission mode 10.

7. The method according to claim 1, wherein the CSI-RS resource configuration information further includes information on one or more antenna ports used to transmit a demodulation reference signal (DMRS) assumed to be quasi-co-located with the antenna ports used to transmit the CSI-RS with respect to large-scale properties of radio channels.

8. The method according to claim 1, wherein the CSI-RS and the CRS are transmitted from different cells.

9. A method for transmitting, by a base station, a channel state information (CSI)-reference signal (RS) in a wireless communication system, the method comprising:
transmitting CSI-RS resource configuration information through higher layer signaling to a mobile terminal and transmitting the CSI-RS according to the CSI-RS resource configuration information; and
receiving, from the mobile terminal, CSI derived based on the CSI-RS,
wherein the CSI-RS resource configuration information includes information on one or more cell specific-RS (CRS) antenna ports used to transmit the CSI-RS.

10. A mobile terminal configured to receive a channel state information (CSI)-reference signal (RS) in a wireless communication system, the mobile terminal comprising:
a radio frequency (RF) unit; and
a processor configured to control the RF unit,
wherein the processor is further configured to:
receive CSI-RS resource configuration information through higher layer signaling and receive the CSI-RS according to the CSI-RS resource configuration information,
derive CSI based on the CSI-RS, and
report the derived CSI to a base station, and
wherein the CSI-RS resource configuration information includes information on one or more cell specific-RS (CRS) antenna ports assumed to be quasi-co-located with one or more antenna ports used to transmit the CSI-RS.

11. The mobile terminal according to claim 10, wherein the information on the one or more CRS antenna ports is used to acquire a large-scale property of a radio channel from the one or more antenna ports used to transmit the CSI-RS.

12. The mobile terminal according to claim 11, wherein the large-scale property of the radio channel from the one or more antenna ports used to transmit the CSI-RS is derived from a radio channel from an antenna port used to transmit the CRS.

13. The mobile terminal according to claim 11, wherein the large-scale property of the radio channel includes at least one of delay spread, Doppler spread, Doppler shift, average gain and average delay.

14. The mobile terminal according to claim 10, wherein the information on the one or more CRS antenna ports includes identification information about the CRS.

15. The mobile terminal according to claim 10, wherein the mobile terminal is configured in transmission mode 10.

16. The mobile terminal according to claim 10, wherein the CSI-RS resource configuration information further includes information on one or more antenna ports used to transmit a demodulation reference signal (DMRS) assumed to be quasi-co-located with the antenna ports used to transmit the CSI-RS with respect to large-scale properties of radio channels.

17. The mobile terminal according to claim 10, wherein the CSI-RS and the CRS are transmitted from different cells.

18. A base station configured to transmit a channel state information (CSI)-reference signal (RS) in a wireless communication system, the base station comprising:
a radio frequency (RF) unit; and
a processor configured to control the RE unit,
wherein the processor is further configured to:
transmit CSI-RS resource configuration information through higher layer signaling to a mobile terminal and transmit the CSI-RS according to the CSI-RS resource configuration information, and
receive, from the mobile terminal, CSI derived based on the CSI-RS, and
wherein the CSI-RS resource configuration information includes information on one or more cell specific-RS (CRS) antenna ports assumed to be quasi-co-located with one or more antenna ports used to transmit the CSI-RS.

* * * * *